United States Patent Office 3,479,220
Patented Nov. 18, 1969

3,479,220
ACID-MODIFIED STARCHES AND FLOURS AND METHOD OF MAKING THE SAME
Peter J. Ferrara, New York, N.Y., assignor to Keep Chemical Company, New York, N.Y., a corporation
No Drawing. Filed Mar. 24, 1966, Ser. No. 536,957
Int. Cl. C13l 1/08
U.S. Cl. 127—38           6 Claims

ABSTRACT OF THE DISCLOSURE

Acid modified starch or cereal flour is prepared by intimately contacting flour or starch with a concentrated mineral acid applied onto a dry inert finely divided carrier.

---

This invention relates to acid-modified starch and flour products and the preparation thereof.

In the known processes of preparing acid-modified starches, the starch to be modified is first slurried in water and the water slurry thereafter acidified with dilute hydrochloric acid, sulfuric acid, or other acid or mixture thereof. The acidified slurry formed is then heated to temperatures below the point where pasting or gelatinization of the starch occurs. Under this controlled action of acid and temperature, the starch cells are acid-modified. Samples of the aqueous starch slurries withdrawn at intervals and compared visually show no noticeable changes or differences in the intact granules. On being slurried, however, and analyzed in a viscometer, they show reduced hot paste viscosity. When the desired acid-modification has ben obtained, as indicated by a lowering of paste vicosity to a useful level, the starch slurry is neutralized. The discrete starch particles are thereafter recovered by filtration or centrifugation, washed free of impurities and dried. Acid-modified starches prepared in this manner are available commercially in various grades. The extent of acid-modification is generally designated by fluidity values which represent the reciprocal of viscosity. The users of such starches are aware of how products of given fluidity values will perform in their operations.

While acid-modification of starches in the form of water slurries is well known and has been in practice for many years, the known aqueous methods are not applicable to flours made from ceral grains or starchy tubers. This is due to the presence in such flours of extraneous materials, chiefly protein, fiber, fat, and ash. These components not only complicate acid-modification and, in particular, the rate thereof, but additionally have an effect on the quality of the acid-modified product, rendering it unsuitable for many applications. Finally, the known wet processes are costly and difficult, particularly as concerns recovery of the desired products.

In order to avoid the difficulties incurred in processing starchy flours when aqueous slurry techniques are used, there have been developed various other procedures for carrying out the acid-modification. Generally, these depend on devices for spraying or atomizing and similar means for creating fine mists or droplets of the acid and for bringing the mineral acids into direct contact with the starchy flours while the same are being agitated. Good distribution of the acid is required in order to prevent agglomeration and necessitates the use of intensive mixing with dilute acid solutions. The use of dilute acid, such as hydrochloric acid in conjunction with the normal moisture level of a commercial starchy flour, produces a dilution of the acid, retarding the rate of acid-modification as well as giving rise to the stickiness associated with the aqueous slurry techniques. In order to avoid these disadvantages, it has been proposed to pre-dry the flours to moisture levels of 3% and less. This is obviously very costly and, in fact, the costs run up in such pre-drying, in many instances exceed all of the other process charges.

In order to avoid the aforesaid difficulties, it has been proposed to use the hydrochloric acid either in more concentrated form or in the form of a pure vaporized hydrochloric gas. These processes in which the starchy flours are directly contacted with relatively concentrated acids result in the production of products containing dark-colored specks and small lumps. Removal of both the discolored matter and the lumps by sifting yields a product having the properties associated with excessive acid treatment. Moreover, when concentrated acid is used, the high speed at which the acid-modification proceeds gives rise to increases in temperature, necessitating cooling to maintain the reaction within the proper temperature range. As anyone familiar with cooling granular materials knows, the poor rates of heat transfer associated with this type of cooling make such procedures highly difficult and therefore undesirable. Furthermore, processes based on using concentrated mineral acids require the addition of large amounts of alkali for the neutralization, which, in itself, involves considerable difficulties and disadvantages.

Notwithstanding the difficulties posed by the available processes for flour and starch modification, a substantial amount of acid-modified starches and flours is regularly produced for broad and varied markets. It is recognized that there are many more potential applications for acid-modified starches and that these would be realized were more economic procedures and techniques available.

It is an object of this invention to provide a method of preparing suitable acid-modified starches and flours at a reduced cost of production.

It is a further object to provide a practical and economical method for the distribution of the mineral acid in a uniform manner throughout the starch or flour in its usual granular dry state of commerce.

Still another object is to obtain the desired degree of acid modification of the starch or flour without the necessity of using an excess of mineral acid whereby the need for neutralizing agents to arrest the action of the acidifying agent is eliminated.

Still another object of the invention is to provide a method for the acid-modification of flours and starches without the need for pre-drying these materials to low levels of moisture content.

It is still another object of the invention to provide acid-modified starches and flours of reduced viscosity having the other requisite properties demanded by industry.

These and other objects and advantages will be made apparent from the following description of the invention:

According to the present invention it has been found that the above and other objects are accomplished and acid-modified starch and flour products characterized by improved flow and dispersion properties obtained in a simple and economical manner by intimately contacting dry flour and starch with a concentrated mineral acid applied onto a dry inert finely divided carrier.

The finely divided inert carrier materials having very large surface areas and pore volumes and capable of adsorbing up to 250% and more of their own weight of mineral acid while retaining the characteristic mobility of dry powders are suitable for use herein as carriers for the acid. The inert carriers contemplated for use herein are generally identified by the following designations: micro-silicas, powder expanded silica clays, and as aluminates or silicoaluminates. These products are obtained both by chemical synthesis and from natural sources. Instances of preferred carriers include Silene,[1] Hi-Sil,[2] Florex,[3] Zeolex,[4] Micro-cel,[5] and the like.

Thus, in accordance with the invention, the finely divided inert materials designated "aluminates" and "silicates" and capable of acting as carriers for acids such as hydrochloric acid, which are characterized by large surface areas and low bulk density, are suitable for use herein. The bulk densities range from 1-5 lbs. per cu. ft. The surface areas range from 75-200 sq. meter/g. and the mean particle size from 10-15 millimicrons. Many of the available carriers having the following properties will absorb up to 560% of their weight in water, oil, acids, and other various organic materials without losing their free-flowing properties. Free-flowing materials having a hydrochloric acid content of 30-31% by weight derived by treatment of the carrier with the available 23° Baumé acid are preferably used in accordance with the invention, although products produced from 20-25% HCl are also equally suitable. Lower acid levels require the use of much larger quantities of inert carrier in order to distribute the same quantity of acid. The use of excessive carrier materials is not advantageous in most instances.

The acid-impregnated carrier can be produced in the conventional manner. Generally, it suffices to supply to a ribbon blender or twin cone blender hydrochloric acid (23° Baumé) in an amount of 200 lbs., which is equivalent to 37.14% HCl by weight along with 100 lbs. of finely divided carrier, and to operate the blender for a comparatively brief interval of up to 5 minutes. There is thereby formed the acid carrier in the form of a free-flowing powder providing a source of hydrochloric acid in dry form at a concentration of close to 25% by weight. The use of this acid-impregnated carrier to modify starches and flours produces a product having highly desirable properties without resort to the heretofore required costly equipment or temperature control, pre-drying, atomization and the like. The product obtained by intimately contacting the acid-impregnated carrier with the flour or starch can be immediately transferred without neutralization into the usual packaging container, i.e., bag, drum, or the like, and no further treatment is required.

The process of the invention has a unique and unexpected advantage and, namely, that very small quantities of mineral acids suffice to produce the desired degree of modification of the starch or flour. It has been established that the amount of mineral acid required to obtain a particular fluidity or acid-modification in accordance with the invention amounts to only 50 to 60% of that heretofore reported as being necessary.

It has been found that the quantity of acid required to be added to effect the desired starch or flour modification amounts to from 0.3 to 2.0%. The quantity of acid varies within the aforesaid range with the degree of modification sought to be achieved, the nature of the starting material, i.e., starch or flour, and in particular on its content of impurities as, for instance, ash, protein, fat, and fiber, as well as on the partcile size thereof and, to some extent, on the mineral acid employed.

For the purposes of the invention, suitable mineral acids include hydrochloric acid, sulfuric acid, phosphoric acid, and the like. In each instance, however, the acid is utilized adsorbed onto an inert carrier as hereinbefore set out, producing a dry free-flowing acidifying agent.

In order to determine the rate at which the acid modification of the starch or flour product takes place using the mineral acid impregnated inert carrier in accordance with the invention, there is utilized the conventional apparatus for measuring changes in viscosity of aqueous starch or flour suspensions while the same are being heated at a constant rate from a temperature of 40° C. up to 92.5° C. The starch or flour slurries are first adjusted to a pH of 6.0 using lime for the adjustment. In this manner the effect of pH on the hot paste viscosity is ruled out, and relative comparisons in viscosity are facilitated. The conventional and commercially available viscosity measuring devices can be used for this purpose. The comparisons reported hereinafter are based on determinations carried out on the C. W. Brabender Co. amylograph which had been equipped with a 700 g./cm. cartridge unit. In order to eliminate the relative effects occurring during acid modification, the comparisons for a particular starch or flour—i.e., corn starch, tapioca starch, potato starch, milo flour, wheat flour, corn flour, etc.—were made utilizing slurry concentrations which permitted the observance of significant variations in viscosity from the control or initial reading. Further in recording the initial viscosity reading, samples of starches or flour were slurried in water along with equal amounts of acid carrier and immediately neutralized with lime before carrying out and recording the viscosity reading corresponding to each sample. In this manner, the effect of any soluble salts present on the control starch or flour was eliminated.

The examples below illustrate more clearly the mode of carrying out the process of the invention and the products obtained thereby but are not to be construed as in any wise effecting a limitation of this invention.

EXAMPLE 1

A carrier acid mixture was prepared from Zeolex-7A (trade name of a silico-aluminate) and hydrochloric acid. The hydrochloric acid content of the resulting product amounted to 21.4% by weight. 20.0 g. of the resulting acid impregnated carrier were then added to 1200 g. of a commercial A-grade of tapioca flour. The dry materials were shaken in a paper bag and allowed to stand at room temperature (about 25.0° C.). The addition of the acid carrier was equivalent to 0.357% hydrochloric acid based on the original material. Samples of the untreated tapioca product were slurried in water using a ratio of 50 parts of tapioca to 400 ml. of water and the pH adjusted to 6.0 from the "native" value of 4.2. When heated to 92° C., the control tapioca showed a viscosity peak of 1840 Brabender Units (B.U.). In contradistinction, when a series of samples of acidified tapioca mixture taken at daily intervals were subjected to the same procedure, they showed a very precipitous drop in hot paste viscosity. The quantity of sample tested in each instance amounted to 50.83 g., thus allowing for the addition of the acidified aluminate. The pH of the acidified tapioca, when the ingredients (tapioca and acid carrier) were first mixed, amounted to 2.2 and at the end of ten days the pH was found to have risen to 2.8, but there- ---
[1] Trade name of a silicate having a surface area of 80 m.²/g. and a particle size of 0.030 microns having the following composition: SiO₂—64%; CaO—18%; Fe₂O₃—0.15%; Al₂O₃—0.6%; MgO—0.1%; and NaCl—1.5%; manufactured by Columbia-Southern Chemical Corp., Barberton, Ohio.
[2] Trade name of a silicate having a surface area of 150 m.²/g. and a particle size of 0.022 microns having the following composition: SiO—87%; CaO—0.5%; Fe₂O₃—0.2%; Al₂O₃—0.6%; and NaCl—1.0%; manufactured by Columbia-Southern Chemical Corp., Barberton, Ohio.
[3] Trade name of a fuller's earth having a surface area of 120 m.²/g. and a pore volume of 0.45 ml./.; manufactured by The Floridin Co., Tallahassee, Fla.
[4] Trade name of a precipitated, hydrated sodium silico-aluminate having a mean particle diameter (millimicrons) of 10-50, a specific gravity of 2-2.1, a bulk density (aerated lbs./cu. ft.) of 3. Manufactured by J. M. Huber Corp., New York, N.Y.
[5] Trade name of a synthetic hydrous calcium silicate having a bulk density of 3 to 5 lbs./cu. ft. and a surface area of from 95-180 sq. meters/g. Obtained from Johns-Manville Cellite Division, New York, N.Y.

after remained constant. During this 10-day interval, the viscosity of samples of tapioca (50.83 grams in each instance) was determined, the resulting values being set out in the table which follows:

TABLE I.—VISCOSITY IN BRABENDER UNITS OF ACIDIFIED TAPIOCA

| Days standing | Viscosity | Days standing | Viscosity |
|---|---|---|---|
| Start | 1,840 | 6 | 350 |
| 1 | 1,490 | 7 | 290 |
| 2 | 1,180 | 8 | 200 |
| 3 | 900 | 9 | 140 |
| 4 | 650 | 10 | 100 |
| 5 | 430 | | |

Determination of the viscosity of the acidified tapioca following the expiration of another 20 days established that a further reduction in viscosity amounting to 30 B.U. had taken place after the initial 10-day exposure interval.

EXAMPLE 2

Example 1 was repeated but using a B grade (lower quality) tapioca and with an increase in the amount of acidified carrier to 2.0%, equivalent to 0.43% hydrochloric acid. The peak viscosity decreased from an initial value of 1150 to 20 B.U. within a period of 11 days. The grade of tapioca, identified here as B grade, is recognized by its generally poor odor, lower pH (initial value of 3.4), and lower viscosity characteristics. The difference in the aforesaid values arises from the formation and exposure to larger amounts of organic acids during the preliminary purifying of the tapioca in the course of its production.

It was to be expected that the poorer grades of tapioca would react more quickly to produce lower viscosities under the influence of acid carriers because of the molecular bonds within the starch configurations, amylose, and amylopectin, had become somewhat strained, and this result was, in fact, observed.

When sulfuric acid impregnated carrier was employed, similar changes in viscosity were observed.

EXAMPLE 3

The acid modification procedure set out above was repeated with several grades of milo flour (a grain sorghum). The results establish a degree of predictable acid modification provided that the acid modifying agent was used according to a schedule chosen for a particular grade of flour. The runs were carried out using two low grades of commerce, one, a long extraction grade which contained larger quantities of fiber, fat, protein, and ash, and, the other, a shorter extraction grade characterized by a reduced amount of these components. It was apparent from these runs that the same procedure for acid modification was applicable to the full range of milo flour available. The differences in composition between the two grades of milo used in this example are set out in the following table.

TABLE II.—TYPICAL MILO ANALYSES

| Component: | A Grade, percent | B Grade percent |
|---|---|---|
| Moisture | 11-12 | 11-12 |
| Ash | 0.7 | 1.4 |
| Protein | 9.0 | 9.5 |
| Fat | 2.0 | 3.0 |
| Fiber | 0.8 | 2.0 |
| Starch by difference | 75-76 | 70-73 |

Milo which had been acidified by means of an absorbent carrier comprising a synthetic calcium silicate (Micro-Cel-E, a trade name of Johns-Manville Corp., New York, N.Y.) was impregnated with HCl to acid content therefor of 22.5%. The quantity of milo used per 400 ml. of water in the amylograph tests amounted to 65.0 g. A larger amount of flour was used in this instance because milo is of a coarser granulation than tapioca and, unless the concentration of milo in the gelatinized form is sufficient to create a reasonably high viscosity, the clusters of fine starch adhering to the branny fractions would fail to reflect a true viscosity value.

In carrying out the tests, it was established that, in order to obtain the acid modification of milo A capable of producing approximately the same changes in viscosity as observed in connection with the tapioca, the amount of acid in the form of carrier impregnated with acid had to be increased. A 65 g. sample of milo A was slurried in 400 ml. of water. The pH of the slurry was increased from 5.4 to 6.0 by addition of lime. The initial viscosity peak amounted to 1,675 B.U. In order to lower the viscosity by acid modification to a range of from 80 to 100 B.U. within a period of 10 days, it was necessary to use 3.75% of acid carrier, the latter being equivalent to 0.84% hydrochloric acid based on the milo. This amount of acid lowered the pH of the milo-acid carrier mixture to a value of 2.4. The pH of the mixture gradually increased within a 10-day period to 3.1 after which both the pH and the reduced viscosity values leveled off. When the same acid carrier material was used with milo B. It was found necessary to increase the amount of acid carrier to 4.65% corresponding to 1.09% hydrochloric acid based on the milo. This higher acid requirement which at first appeared surprising as the initial peak viscosity readings of milo B using a sample of 65 grams milo per 400 ml. of water was only 1050 B.U. compared to 1675 B.U. for milo A. It was established by checking the pH of the milo B acid carrier mixture that, even with an addition of 4.65% of the acid carrier, the pH amounted to 2.6, whereas a lower value was to be expected. It was obvious therefrom that the greater incidence of ash, protein, fat, and fiber in the milo B produced a buffering effect which tended to interfere with the action of the modifying acid on the starch. To a certain extent, the observed retardation of the acid modification, as noted herein, may also be attributed to particle size or granulation; the larger granules being somewhat more difficultly penetrative by the hydrochloride as it is released from the carrier surface. While this latter presumption was borne out from the granular particle ranges of normal milo flour, this factor alone did not have as significant a bearing on the quantity of modifying acid required as did the presence of the impurities previously noted—i.e., protein, ash, fat, and fiber.

EXAMPLE 4

Dry-milled corn flours were processed in accordance with the invention with inert carriers impregnated with a mineral acid and the resulting products established to have acid-modified characteristics and properties rendering them suitable for a variety of commercial applications calling for low-cost starch products. There was utilized for the purposes of this example two grades of corn flour. A grade A product constitutes a coarse ground flour produced without concern for careful removal of germ and fiber, and a grade B product, while more finely ground than the A product, constitutes nevertheless a crude material by most standards. The average analyses and compositions of the dry-milled corn flours as used here are set forth in Table III which follows:

TABLE III.—AVERAGE ANALYSES OF DRY-MILLED CORN FLOURS

| | Percent | |
|---|---|---|
| | Grade "A" | Grade "B" |
| Moisture | 13.0 | 13.0 |
| Protein | 8.5 | 6.5 |
| Fat | 4.2 | 1.7 |
| Ash | 0.8 | 0.5 |
| Fiber | 1.3 | 0.4 |
| Starch | 73.0 | 78.5 |
| Granulation: | | |
| Percent on U.S. 60 mesh | 10 | Trace |
| Percent of U.S. 100 mesh | 15 | 25 |
| Percent on U.S. 20 mesh | 70 | 35 |
| Percent through 200 mesh | 5 | 45 |

Samples of both grades A and B were blended with an inert acid carrier and the viscosity peak values thereafter determined over a period of time at designated intervals. The acid modification was carried out at two levels of acid content. The changes in pH values were also determined for both types of flour. The results of the determinations are set out in Table IV as follows:

TABLE IV.—PEAK VISCOSITY IN B.U. AND pH READINGS, RELATED TO ACID MODIFIED CORN FLOURS A AND B, WITH HCl LEVELS OF 0.40% AND 0.69%; CONCENTRATION 65 GRAMS PER 400 ml. WATER

| | Corn Flour A | | | | Corn Flour B | | | |
|---|---|---|---|---|---|---|---|---|
| | 0.40% HCl | | 0.69% HCl | | 0.40% HCl | | 0.69% HCl | |
| Days from Start | Viscosity | pH | Viscosity | pH | Viscosity | pH | Viscosity | pH |
| 0 Control | 1,140 | <2 | 1,140 | <2 | 1,750 | <2 | 1,750 | <2 |
| 1 | 920 | 2.40 | 900 | 2.20 | 1,300 | 2.00 | 1,050 | 2.00 |
| 2 | 730 | 2.40 | 800 | 2.20 | 1,180 | 2.10 | 875 | 2.10 |
| 3 | 600 | 2.50 | 660 | 2.30 | 1,040 | 2.30 | 700 | 2.10 |
| 4 | 580 | 2.60 | 610 | 2.40 | 910 | 2.40 | 540 | 2.20 |
| 5 | 560 | 2.70 | 440 | 2.50 | 800 | 2.60 | 350 | 2.30 |
| 6 | 510 | 2.80 | 300 | 2.70 | 825 | 2.70 | 210 | 2.40 |
| 7 | 465 | 3.00 | 230 | 2.80 | 710 | 2.80 | 155 | 2.40 |
| 8 | 420 | 3.10 | 180 | 3.00 | 525 | 2.90 | 95 | 2.50 |
| 9 | 400 | 3.20 | 180 | 3.10 | 460 | 2.90 | 60 | 2.60 |
| 10 | 400 | 3.20 | 170 | 3.10 | 415 | 2.90 | 40 | 2.70 |
| 20 | 390 | 3.30 | 160 | 3.20 | 380 | 2.90 | 35 | 2.80 |
| 30 | 390 | 3.40 | 160 | 3.20 | 360 | 2.90 | 35 | 2.80 |

The two grades of dry-milled corn flour showed the buffering effect which the presence of higher ash, fiber, and fat contents have on the acid modification of starchy flours and also demonstrated very clearly how the acid modification effects were tapered off and entirely completed after a definite interval related to the quantity of the selected dry-milled corn flour and the initial charge of acid carrier. In the instant example, as inert acid carrier, there was employed calcium alumino-silicate commercally available under the trade name ZEO-45SD[6]. The ZEO-45SD was mixed with hydrochloric acid to produce an acid carrier containing 20.2% HCl by weight. Separate lots of 6,000 g. each of corn flours A and B were blended with 2% and 3.4% of acid carrier (this percentage was based on percentage of the dry flour, a calculation generally referred to as a baker's percentage) and the resulting blends packaged in small multi-wall paper bags similar to those used in commercial shipments between producer and user. The bagged samples were thereafter maintained at room temperature. The amount of hydrochloric acid in each acid modified flour was 0.40% and 0.69%, respectively, for A and B grades, both quantities being in a range well below any effective levels of acid use reported heretofore in the literature. Sample quantities equivalent to 65.0 g. of the original dry flour were taken for viscosity test purposes. The 65.0 g. samples were each slurried in 400 ml. water and the pH thereof adjusted to a value of 6, using lime before carrying out the tests on the Brabender amylograph. The results of the tests are set out in Table IV above and illustrate how variations in the amount of acid carrier applied to various grades of dry-milled corn flour available in commerce may be utilized to bring about the degree of acid modification required in connection with some particular application. Furthermore, the results establish that the modification occurs within a practical interval without the requirement of neutralization and without complicated and costly devices for pre-drying the flour and/or for introducing mineral acid sprays or mists and/or for the control of product temperature during the acid modification.

The data establish again that the inert carrier at temperatures involved—i.e., room temperature, will slowly release its content of acid, and that 90% or more of the potential acid modification action takes place within a period of six to eight days. This period is within the practical time limits spanning normal production, delivery, and usage, as practiced by most commercial installations using these acid modified materials.

It was, furthermore, again observed that the presence of protein, ash, fiber, and fat effects a buffering or retardation on the process of acid modification, and it was established that above certain pH values the effect of any residual free mineral acid is very slight and of no consequence. Thus, if commercial starches are used which have been especially processed for removal of impurities, a pH level of 2.6 to 3.0 is sufficient to retard any additional or continuing effects of the mineral acids. As the amounts of impurities expressed as ash, fiber, protein, and fat increase, and these would be the conditions met with dry-milled flour products, these values are higher, falling in the range of 2.8 to 3.2 for diverse grades of dry corn, milo sorghum, and wheat flours. When other preparations, including soft and hard wheat flours ranging from high-grade quality, where the level of ash is low, to clear flour, where the ash amounts to 1.0% and more, were subjected to the process described herein (the latter flours are generally not considered to be economical materials for use involving acid modified flours), it was found that, whereas mineral acid levels in the range of 0.30% to 0.70% hydrochloric acid are within the practical lower limits of acid addition for acid modification of starches and a variety of cereal flours, useful acid modified products could be obtained from the wheat flours with hydrochloric acid levels up to a range of 1.5% to 2% depending on the degree of modification desired and the buffering capacity attributable to the impurities such as ash, protein, fat, and fiber.

Thus, in accordance with the invention, there is disclosed a method for processing a starchy material consisting of amylopectin and amylose in the presence or absence of protein, fat, fiber, or ash so as to concurrently but differentially depolymerize the amylopectin and amylose, preferentially the amylopectin, and to provide reduced paste viscosity unassociated with other disadvantageous properties.

I claim:

1. A method for treating starches and cereal flours with mineral acids to produce acid-modified starches and cereal flours having improved flow and dispersion properties, comprising intimately contacting said flour or starch with a finely divided carrier impregnated with a concentrated mineral acid, wherein said carrier is a member selected from the group consisting of microsilicas, expanded silica clays, aluminates and silicoaluminates and said acid impregnated carrier is utilized in an amount sufficient to provide 0.30 to 2.0% acid by weight of said flour or starch allowing said mixture to stand for about 5 to 10 days and recovering a free-flowing acid modified flour or starch characterized in that an 8 to 16% paste formed therefrom has an amylograph viscosity of less than 100 B.U. at about 92° C. and substantially no loss in strength-contributing properties.

2. A method according to claim 1, wherein said acid is concentrated hydrochloric acid and is present referred to said carrier in an amount of about 20 to 31% by weight.

3. A method according to claim 1 wherein said carrier has a bulk density of from 1–5 lbs. per cu. ft., a surface area of from 75–200 sq. meters/g. and a mean particle size of 10–15 millimicrons.

4. A method for treating starches and cereal flours with mineral acids to produce acid-modified starches and cereal flours having improved flow and dispersion properties and being further charactertized by reduced paste viscosity without any loss in strength-contributing properties, which comprises intimately contacting said flour or starch with a concentrated mineral acid applied onto a dry inert finely divided carrier, said acid being used in an amount of 0.30 to 2.0% acid by weight of said flour or starch, agitating the acid-carrier flour or cereal starch mix to form an initimate mixture, allowing said mixture to stand for about 5 to 10 days, and recovering a free-flowing acid-modified flour or starch characterized in that an 8 to 16% paste formed therefrom has an amylograph viscosity of less than 100 B.U. at about 92° C. and substantially no loss in strength-contributing properties.

5. A method according to claim 4, wherein said acid is concentrated hydrochloric acid.

6. A method according to claim 4, wherein said carrier is a member selected from a group consisting of microsilicas, expanded silica clays, aluminates and silicoaluminates, and said acid is concentrated hydrochloric acid and is present in an amount of about 20 to 31% by weight referred to said carrier.

References Cited

UNITED STATES PATENTS

| | | | |
|---|---|---|---|
| 696,949 | 4/1902 | Duryea | 127—33 |
| 3,073,724 | 1/1963 | Rankin et al. | 127—33 XR |
| 3,175,928 | 3/1965 | Lancaster et al. | 127—32 XR |

RAYMOND N. JONES, Primary Examiner

J. R. HOFFMAN, Assistant Examiner

U.S. Cl. X.R.

127—29, 32, 33, 67, 71